(12) United States Patent
Zhang et al.

(10) Patent No.: US 11,093,074 B2
(45) Date of Patent: Aug. 17, 2021

(54) TOUCH SCREEN AND DISPLAY DEVICE

(71) Applicants: Hefei Xinsheng Optoelectronics Technology Co., Ltd., Anhui (CN); BOE Technology Group Co., Ltd., Beijing (CN)

(72) Inventors: Xinxiu Zhang, Beijing (CN); Shifeng Xu, Beijing (CN); Xiaodong Xie, Beijing (CN); Min He, Beijing (CN); Tengfei Zhong, Beijing (CN); Bin Pang, Beijing (CN); Yuan Li, Beijing (CN); Tianyu Zhang, Beijing (CN); Xue Zhao, Beijing (CN)

(73) Assignees: Hefei Xinsheng Optoelectronics Co., Ltd., Hefei (CN); BOE Technology Group Co., Ltd, Beijing (CN)

( * ) Notice: Subject to any disclaimer, the term of this patent is extended or adjusted under 35 U.S.C. 154(b) by 0 days.

(21) Appl. No.: 16/833,613

(22) Filed: Mar. 29, 2020

(65) Prior Publication Data
US 2021/0064209 A1 Mar. 4, 2021

(30) Foreign Application Priority Data
Aug. 30, 2019 (CN) .......................... 201910818017.0

(51) Int. Cl.
G06F 3/041 (2006.01)
G06F 3/047 (2006.01)
G06F 3/044 (2006.01)

(52) U.S. Cl.
CPC .......... *G06F 3/04164* (2019.05); *G06F 3/047* (2013.01); *G06F 3/0412* (2013.01); *G06F 3/0445* (2019.05); *G06F 2203/04112* (2013.01)

(58) Field of Classification Search
CPC .... G06F 3/04164; G06F 3/044; G06F 3/0445; G06F 2203/04111
See application file for complete search history.

(56) References Cited

U.S. PATENT DOCUMENTS

| 2015/0060817 A1* | 3/2015 | Sato | H01L 51/5225 257/40 |
| 2015/0293560 A1* | 10/2015 | Choi | G06F 3/0446 345/174 |
| 2016/0109741 A1* | 4/2016 | Lee | G06F 3/04184 349/12 |

* cited by examiner

Primary Examiner — Sanjiv D. Patel
(74) Attorney, Agent, or Firm — Arent Fox LLP; Michael Fainberg

(57) ABSTRACT

The present disclosure provides a touch screen and a display device. The touch screen includes a substrate, and a first metal wiring layer, a second metal wiring layer, and a third metal wiring layer formed on the substrate. A first insulation layer is arranged on a surface of the first metal wiring layer, and the second metal wiring layer is arranged on the first insulation layer. A second insulation layer is arranged on a surface of the second metal wiring layer, and the third metal wiring layer is arranged on the second insulation layer. Electrical connection channels are electrically connected to the second electrode channels in a one-to-one corresponding manner by using through holes, and the electrical connection channels are electrically connected to a second electrode lead terminal, so that the second electrode channels are electrically connected to the second electrode lead terminal.

9 Claims, 6 Drawing Sheets

TOUCH SCREEN AND DISPLAY DEVICE

The present application claims the priority from Chinese Patent Application No. 201910818017.0, filed with the Chinese Patent Office on Aug. 30, 2019, and entitled "TOUCH SCREEN AND DISPLAY DEVICE", which is hereby incorporated by reference in its entirety.

FIELD

The present application relates to the technical field of electronic devices, and in particular to a touch screen and a display device.

BACKGROUND

With continuous improvement of touch technologies, and the pursuit of diversified application scenarios, consumers gradually favor a full screen touch technology. However, wiring needs to be designed in both a row direction and a column direction of sides of a touch screen, and a certain frame is inevitably occupied.

In the prior art, a manner of processing the frame is to shorten a width of the frame to increase a display area of the screen.

SUMMARY

The present disclosure aims at providing a touch screen and a display device. The touch screen is described based on the front.

The present disclosure provides the following technical solution:

a touch screen, including: a substrate, a first electrode lead terminal and a second electrode lead terminal, where the first electrode lead terminal and the second electrode lead terminal are arranged on one side of a peripheral region of the substrate; a first metal wiring layer, a second metal wiring layer, and a third metal wiring layer, where the first metal wiring layer, the second metal wiring layer, and the third metal wiring layer are formed on the substrate; a first insulation layer, where the first insulation layer is arranged between the first metal wiring layer and the second metal wiring layer; and a second insulation layer, where the second insulation layer is arranged between the second metal wiring layer and the third metal wiring layer; where the first metal wiring layer includes a plurality of first electrode channels extending along a first direction, and the plurality of first electrode channels are electrically connected to the first electrode lead terminal; the second metal wiring layer includes a plurality of second electrode channels extending along a second direction, and the second direction is perpendicular to the first direction; a plurality of through holes are formed in the second insulation layer; the third metal wiring layer includes electrical connection channels, where the electrical connection channels are in one-to-one corresponding to the second electrode channels and extend along the first direction; and in each pair of the electrical connection channel and the second electrode channel that are corresponding to each other, the electrical connection channel is electrically connected to the second electrode channel by using the through hole, to electrically connect the second electrode channel to the second electrode lead terminal; where projections of the first metal wiring layer, the second metal wiring layer, and the third metal wiring layer on the substrate separate a portion of the substrate corresponding to an active area into a plurality of light transmission regions that are in a same shape and size and evenly distributed.

In the touch screen provided by the present disclosure, the first metal wiring layer is arranged on the substrate, and the plurality of first electrode channels are electrically connected to the first electrode lead terminal; then the first insulation layer is arranged on a surface of the first metal wiring layer, and the second metal wiring layer is arranged on the first insulation layer; and then the second insulation layer is arranged on a surface of the second metal wiring layer, the third metal wiring layer is arranged on the second insulation layer, the plurality of electrical connection channels are electrically connected to the plurality of second electrode channels in a one-to-one corresponding manner by using the plurality of through holes, and then the plurality of electrical connection channels are electrically connected to the second electrode lead terminal; and in this case, the plurality of second electrode channels are electrically connected to the second electrode lead terminal.

Optionally, the first metal wiring layer includes first grid-like wirings, and the first grid-like wirings include the plurality of first electrode channels and first redundancy wiring portions arranged between every two adjacent first electrode channels, and breaks are formed between portions of the first grid-like wirings arranged in the first redundancy wiring portions and portions of the first grid-like wirings arranged in the first electrode channels, to isolate the first electrode channels from the first redundancy wiring portions; the second metal wiring layer includes second grid-like wirings, and the second grid-like wirings include the plurality of second electrode channels and second redundancy wiring portions between every two adjacent second electrode channels, and breaks are formed between portions of the second grid-like wirings arranged in the second redundancy wiring portions and portions of the second grid-like wirings arranged in the second electrode channels, to isolate the second electrode channels from the second redundancy wiring portions; and the third metal wiring layer includes third grid-like wirings, and the third grid-like wirings include a plurality of electrical connection channels and third redundancy wiring portions between every two adjacent electrical connection channels, and breaks are formed between portions of the third grid-like wirings arranged in the third redundancy wiring portions and portions of the third grid-like wirings arranged in the electrode connection channels, to isolate the electrical connection channels from the third redundancy wiring portions.

Optionally, projections of the first grid-like wirings, the second grid-like wirings, and the third grid-like wirings on the substrate separate a portion of the substrate within the active area into a plurality of light transmission regions having regular triangular outlines.

Optionally, one side of each of the light transmission regions is parallel to the second direction.

Optionally, the projection of the first grid-like wirings on the substrate separates a portion of the substrate within the active area into a plurality of regions having regular hexagonal outlines; the projection of the second grid-like wirings on the substrate separates a portion of the substrate within the active area into a plurality of regions having regular hexagonal outlines; the projection of the third grid-like wirings on the substrate separates a portion of the substrate within the active area into a plurality of regions having regular hexagonal outlines; and for three sides of each of the light transmission regions, a first side is formed by an orthographic projection of the first grid-like wiring on the substrate, a second side is formed by an orthographic projection of the second grid-like wiring on the substrate, and a third side is formed by an orthographic projection of the third grid-like wiring on the substrate.

Optionally, the first electrode channels are driving electrodes, and the second electrode channels are sensing electrodes.

Optionally, the first electrode channels are sensing electrodes, and the second electrode channels are driving electrodes.

Optionally, the first direction is a column direction, and the second direction is a row direction.

Optionally, at least a part of the second electrode channels are electrically connected to the second electrode lead terminal by using two electrical connection channels.

The present disclosure further provides a display device, including a touch screen.

DETAILED DESCRIPTION OF THE EMBODIMENTS

Technical solutions in the embodiments of the present disclosure are clearly and completely described below with reference to accompanying drawings in the embodiments of the present disclosure. Obviously, the described embodiments are only a part of embodiments of the present disclosure, but not all the embodiments. Based on the embodiments of the present disclosure, all other embodiments obtained by ordinary those skilled in the art without creative efforts shall fall within the protection scope of the present disclosure.

In the prior art, the manner of processing the frame cannot implement that there are no frames on two sides of the screen. In addition, shortening the frames will bring inaccurate edge touch or slow response.

Figure 1:
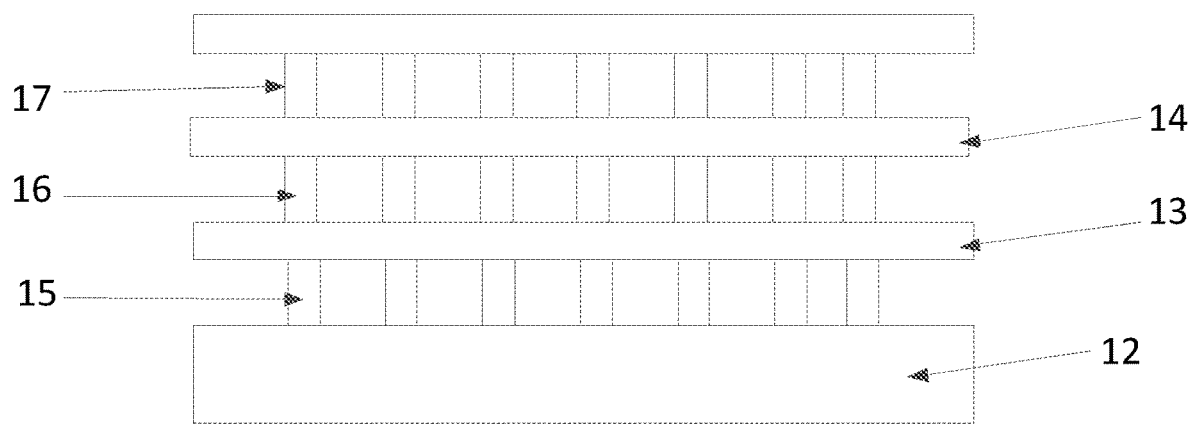
FIG. 1 is a side view of a touch screen provided by an embodiment of the present disclosure.
Figure 2:
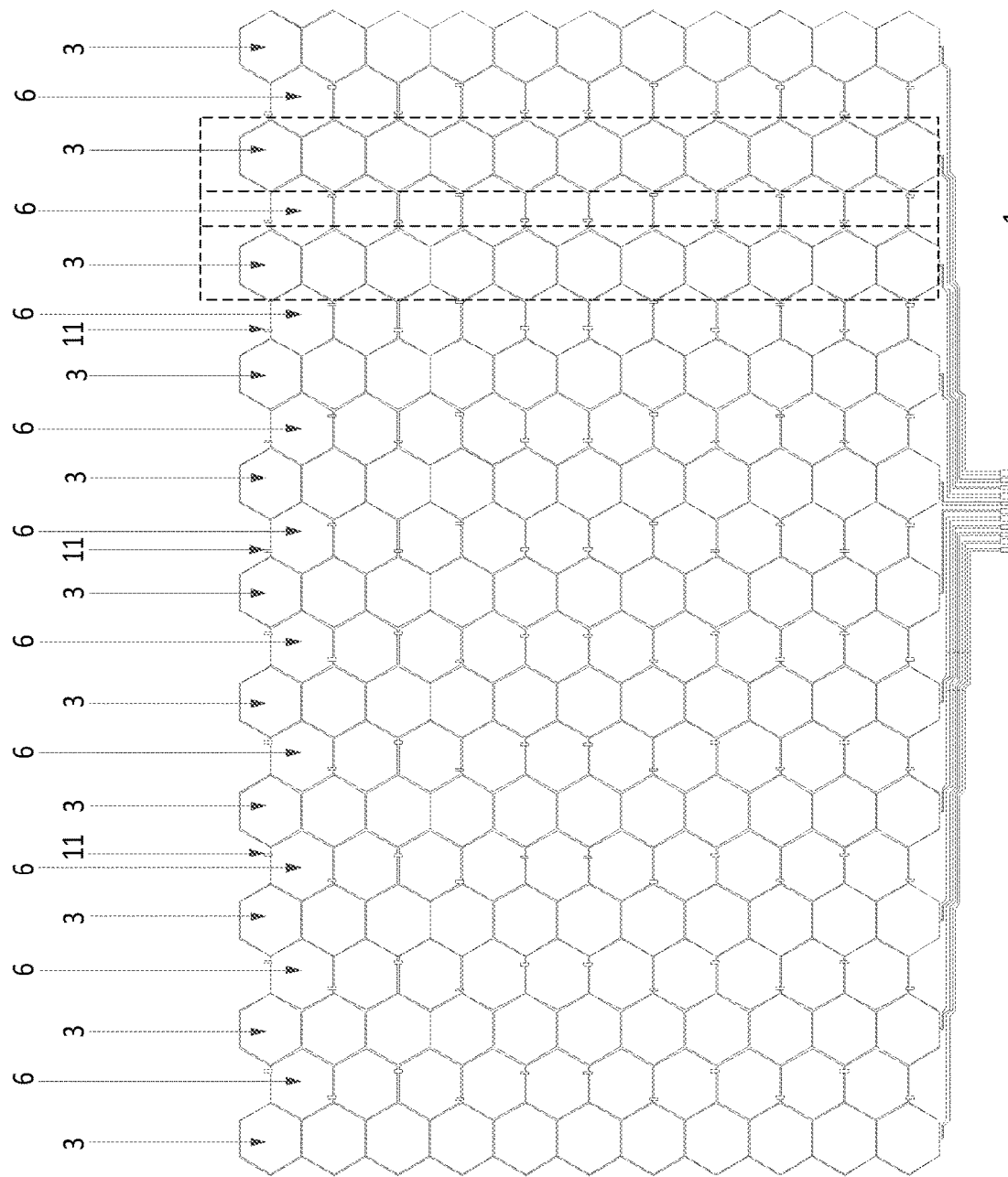
FIG. 2 is a structural schematic diagram of a first metal wiring layer provided by an embodiment of the present disclosure.
Figure 3:
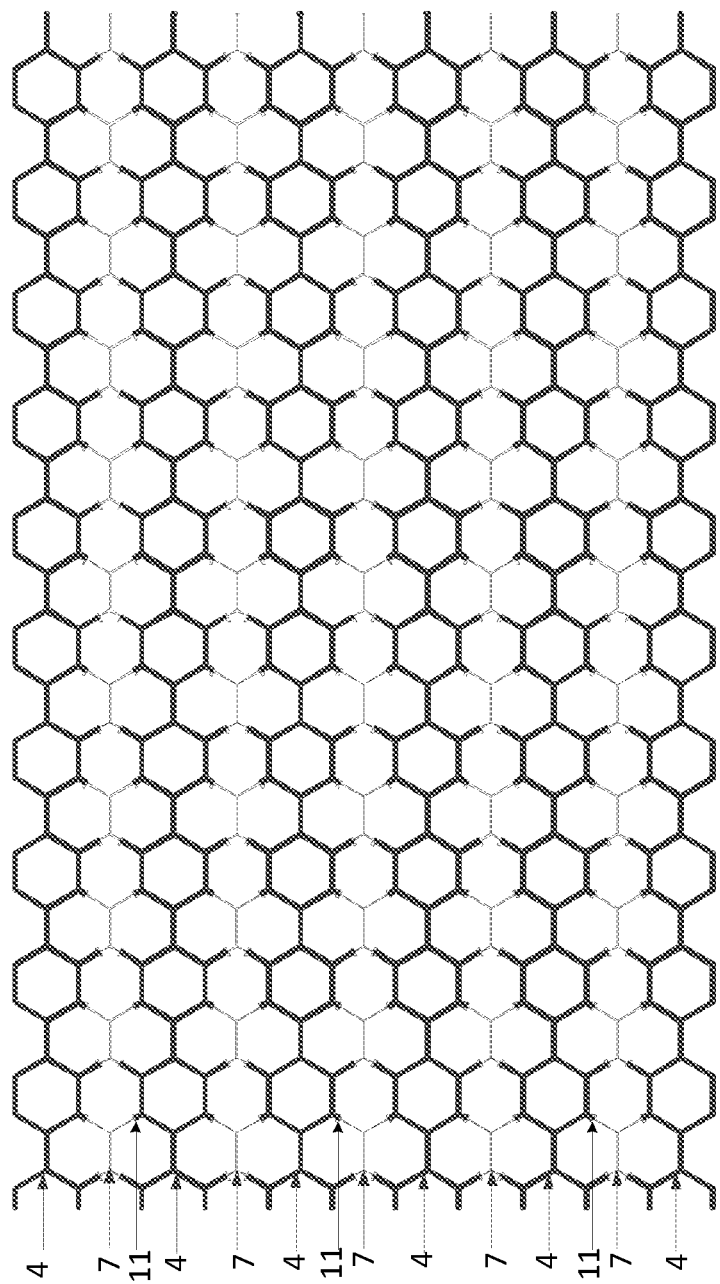
FIG. 3 is a structural schematic diagram of a second metal wiring layer provided by an embodiment of the present disclosure.
Figure 4:
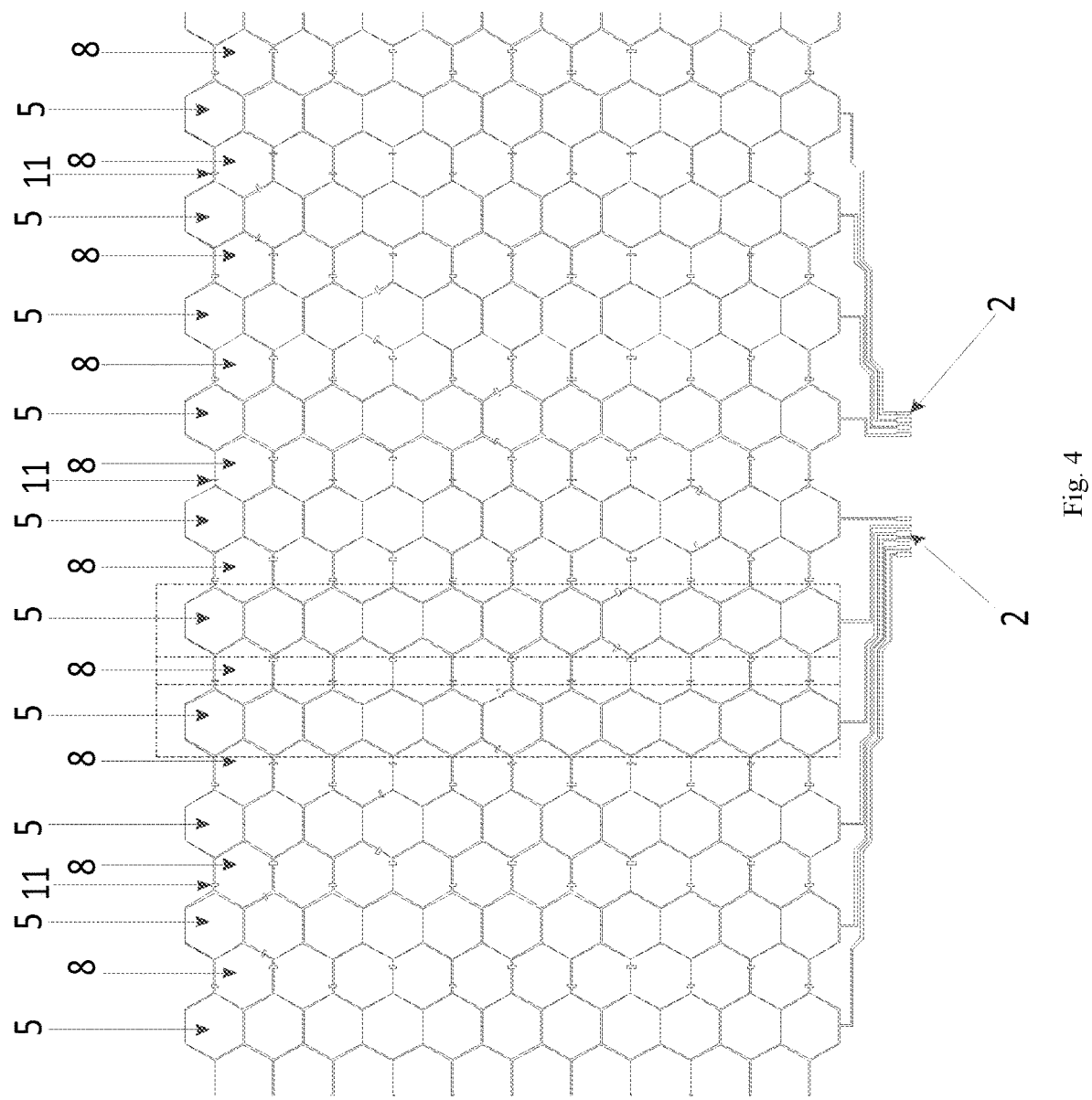
FIG. 4 is a structural schematic diagram of a third metal wiring layer provided by an embodiment of the present disclosure.
Figure 5:
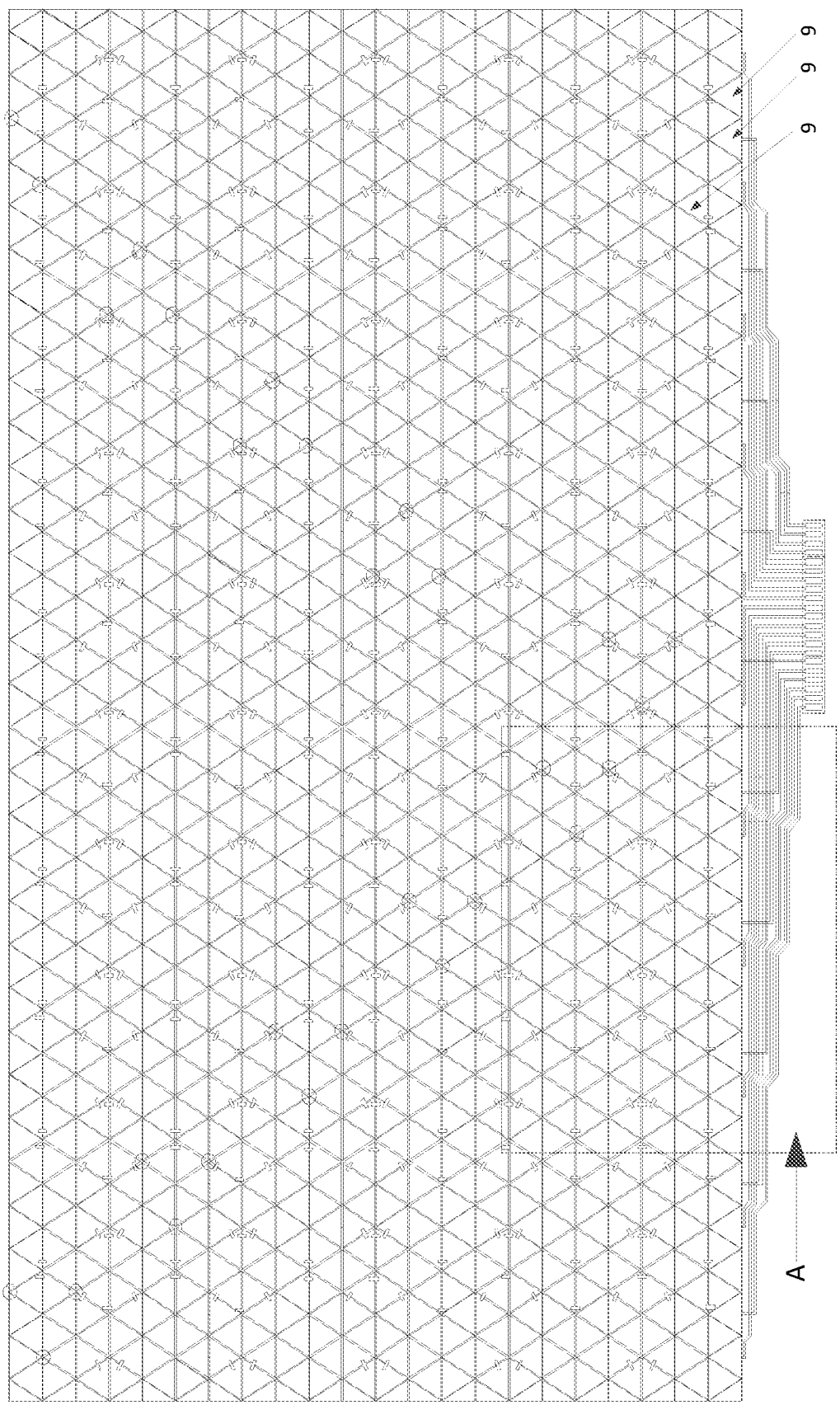
FIG. 5 is a structural schematic diagram of a touch screen provided by an embodiment of the present disclosure.
Figure 6:
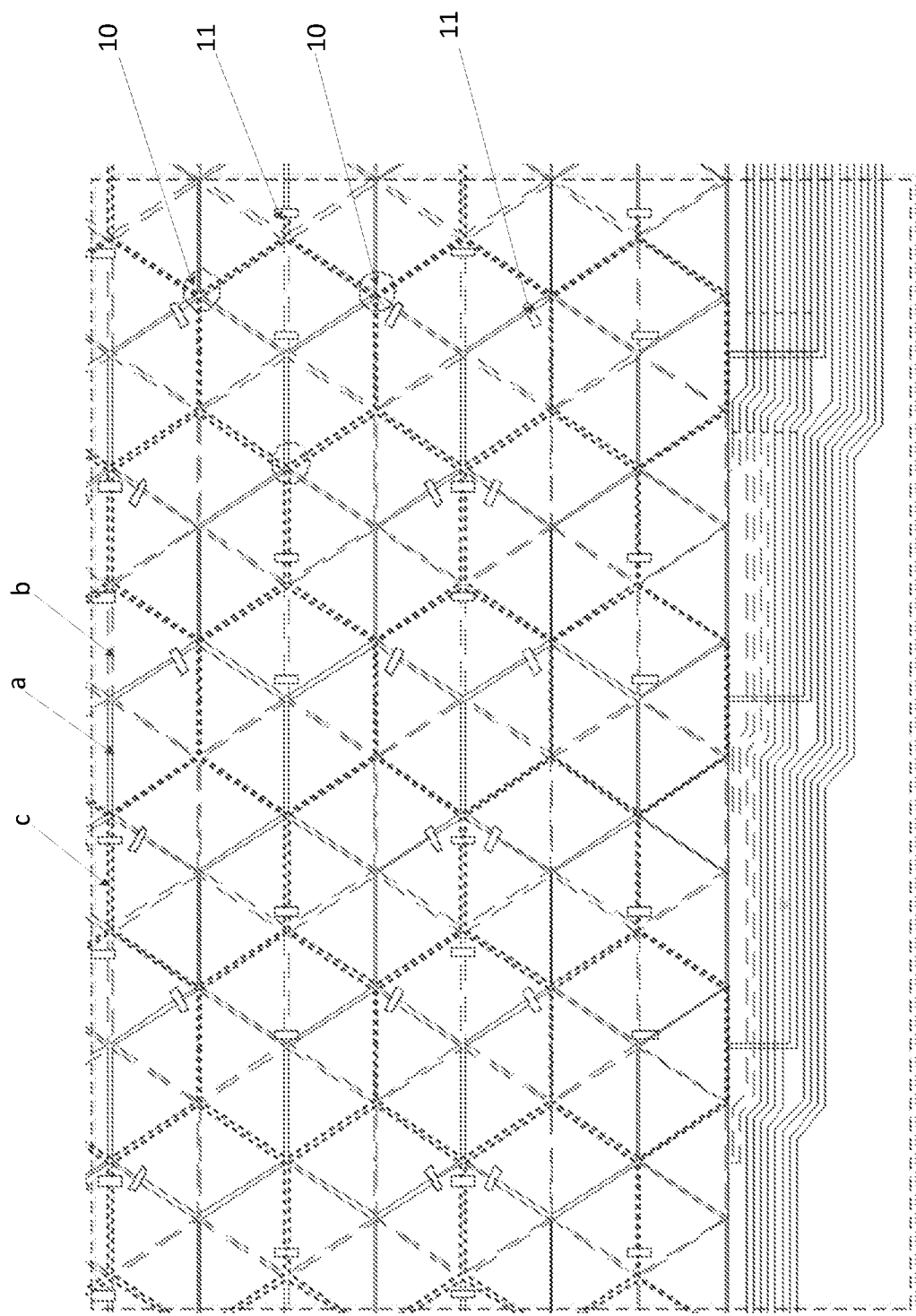
FIG. 6 is an enlarged view of A in FIG. 5 provided by an embodiment of the present disclosure.

FIG. 1 is a side view of a touch screen provided by an embodiment of the present disclosure. FIG. 2 is a structural schematic diagram of a first metal wiring layer provided by an embodiment of the present disclosure. FIG. 3 is a structural schematic diagram of a second metal wiring layer provided by an embodiment of the present disclosure. FIG. 4 is a structural schematic diagram of a third metal wiring layer provided by an embodiment of the present disclosure. FIG. 5 is a structural schematic diagram of a touch screen provided by an embodiment of the present disclosure. FIG. 6 is an enlarged view of A in FIG. 5. Three metal wiring layers are represented by different types of lines in FIG. 6, a is a first metal wiring layer 15 in FIG. 6, b is a second metal wiring layer 16 in FIG. 6, and c is a third metal wiring layer 17 in FIG. 6. As shown in FIG. 1, FIG. 2, FIG. 3, and FIG. 4, a touch screen provided by an embodiment of the present disclosure includes a substrate 12, a first electrode lead terminal 1 and a second electrode lead terminal 2 that are arranged on one side of a peripheral region of the substrate 12; and a first metal wiring layer 15, a second metal wiring layer 16, and a third metal wiring layer 17 formed on the substrate 12, where a first insulation layer 13 is arranged between the first metal wiring layer 15 and the second metal wiring layer 16, and a second insulation layer 14 is arranged between the second metal wiring layer 16 and the third metal wiring layer 17. The first metal wiring layer 15 includes a plurality of first electrode channels 3 extending along a first direction, and the plurality of first electrode channels 3 are electrically connected to the first electrode lead terminal 1. The second metal wiring layer 16 includes a plurality of second electrode channels 4 extending along a second direction, and the second direction is perpendicular to the first direction. As shown in FIG. 6, a plurality of through holes 10 are formed in the second insulation layer 14, the third metal wiring layer 17 includes electrical connection channels 5 that are in one-to-one corresponding to the second electrode channels 4 and extend along the first direction, and in each pair of the electrical connection channel 5 and the second electrode channel 4 that are corresponding to each other, the electrical connection channel 5 is electrically connected to the second electrode channel 4 by using the through hole 10, to electrically connect the second electrode channel 4 to the second electrode lead terminal 2. As shown in FIG. 5 and FIG. 6, projections of the first metal wiring layer 15, the second metal wiring layer 16, and the third metal wiring layer 17 on the substrate 12 separate a portion of the substrate 12 corresponding to an active area (AA) into a plurality of light transmission regions 9 that are in a same shape and size and evenly distributed.

In the touch screen provided by the present disclosure, the first metal wiring layer 15 is arranged on the substrate 12, the plurality of first electrode channels 3 are electrically connected to the first electrode lead terminal 1. Then, the first insulation layer 13 is arranged on a surface of the first metal wiring layer 15, and the second metal wiring layer 16 is arranged on the first insulation layer 13. Subsequently, the second insulation layer 14 is arranged on a surface of the second metal wiring layer 16, then the third metal wiring layer 17 is arranged on the second insulation layer 14, the plurality of electrical connection channels 5 are electrically connected to the plurality of second electrode channels 4 in a one-to-one corresponding manner by using the plurality of through holes 10, then the plurality of electrical connection channels 5 are electrically connected to the second electrode lead terminal 2, and in this case, the plurality of second electrode channels 4 are electrically connected to the second electrode lead terminal 2.

For such a setting manner, firstly, the first electrode lead terminal 1 and the second electrode lead terminal 2 are arranged on the same side of the substrate 12, and the plurality of first electrode channels 3 are directly electrically connected to the first electrode lead terminal 1, and the second electrode channels 4 are electrically connected to the second electrode lead terminal 2 by using the electrical connection channels 5. The connection manner can ensure that there is no need to set wiring on the other three sides except the side on which the first electrode lead terminal 1 and the second electrode lead terminal 2 are arranged among four sides of the screen, to realize a borderless design, so that the proportion of the screen occupied by a touch screen frame is reduced. Moreover, through a mode that the second electrode channels 4 are connected to the second electrode lead terminal 2 by using the electrical connection channels 5, line connection is regular and orderly, and inaccurate edge touch or slow response of the screen caused by chaotic circuit connection do not occur. In addition, the projections of the first metal wiring layer 15, the second metal wiring layer 16, and the third metal wiring layer 17 on the substrate 12 separate the portion of the substrate 12 corresponding to the active area into the plurality of light transmission regions 9 that are in the same shape and size and evenly distributed, so that uniform arrangement of the three metal wiring layers on the substrate 12 is ensured, a problem of screen blanking is avoided, and use efficiency of the touch screen is improved.

As shown in FIG. 2, FIG. 3 and FIG. 4, optionally, the first metal wiring layer 15 includes first grid-like wirings, and the first grid-like wirings includes the plurality of first electrode channels 3 and first redundancy wiring portions 6 located between every two adjacent first electrode channels 3, and breaks 11 are formed between portions of the first grid-like wirings located in the first redundancy wiring portions 6 and portions of the first grid-like wirings located in the first electrode channels 3, to isolate the first electrode channels 3 from the first redundancy wiring portions 6. The second metal wiring layer 16 includes second grid-like wirings, and the second grid-like wirings include the plurality of second electrode channels 4 and second redundancy wiring portions 7 between every two adjacent second electrode channels 4, and breaks 11 are formed between portions of the second grid-like wirings located in the second redundancy wiring portions 7 and portions of the second grid-like wirings located in the second electrode channels 4, to isolate the second electrode channels 4 from the second redundancy wiring portions 7. The third metal wiring layer 17 includes third grid-like wirings, and the third grid-like wirings include a plurality of electrical connection channels 5 and third redundancy wiring portions 8 between every two adjacent electrical connection channels 5, and breaks 11 are formed between portions of the third grid-like wirings located in the third redundancy wiring portions 8 and portions of the third grid-like wirings located in the electrode connection channels 5, to isolate the electrical connection channels 5 from the third redundancy wiring portions 8.

As shown in FIG. 5, projections of the first grid-like wirings, the second grid-like wirings, and the third grid-like wirings on the substrate 12 separate a portion of the substrate 12 within the active area into a plurality of light transmission regions 9 having regular triangular outlines.

In the embodiment, the setting of the regular triangular light transmission regions 9 facilitate close fitting of the projections of the first grid-like wirings, the second grid-like wirings, and the third grid-like wirings within the active area, and the active area is evenly separated.

As shown in FIG. 5 and FIG. 6, optionally, one side of each of the light transmission regions 9 is parallel to the second direction.

As shown in FIG. 2, FIG. 3, and FIG. 4, the projection of the first grid-like wirings on the substrate 12 separates the portion of the substrate 12 within the active area into a plurality of regions having regular hexagonal outlines. The projection of the second grid-like wirings on the substrate 12 separates the portion of the substrate 12 within the active area into a plurality of regions having regular hexagonal outlines. The projection of the third grid-like wirings on the substrate 12 separates the portion of the substrate 12 within the active area into a plurality of regions having regular hexagonal outlines. For the three sides of each of the light transmission regions 9, the first side is formed by the orthographic projection of the first grid-like wiring on the substrate 12, the second side is formed by the orthographic projection of the second grid-like wiring formed on the substrate 12, and the third side is formed by the orthographic projection of the third grid-like wiring on the substrate 12.

In the embodiment, the projections of the first grid-like wirings, the second grid-like wirings, and the third grid-like wirings on the substrate 12 respectively separate the substrate 12 within the active area into the plurality of regions having regular hexagonal outlines. Through the regular hexagonal arrangement, the projections of the first grid-like wirings, the second grid-like wirings, and the third grid-like wirings on the active area can form a plurality of regular triangles. The three sides of each projection in regular triangle belong to the first grid-like wiring, the second grid-like wiring, and the third grid-like wiring, respectively, so that the uniform arrangement of the three metal wiring layers on the substrate 12 is further ensured, a problem of screen blanking is effectively avoided, and use efficiency of the touch screen is improved.

Optionally, the first electrode channels 3 are driving electrodes, and the second electrode channels 4 are sensing electrodes.

Optionally, the first electrode channels 3 are sensing electrodes, and the second electrode channels 4 are driving electrodes.

Where, the first direction is a column direction, and the second direction is a row direction.

Alternatively, the first direction is a row direction, and the second direction is a column direction.

In the embodiment, electrode types and extension directions of the first electrode channels 3 and the second electrode channels 4 are not limited, and can be optionally adjusted according to actual needs.

As shown in FIG. 4, optionally, at least a part of second electrode channels 4 are electrically connected to the second electrode lead terminal 2 by using two electrical connection channels 5.

In the embodiment, when the number of the electrical connection channels 5 exceeds the number of the second electrode channels 4, for a part of the second electrode channels 4, two electrical connection channels 5 may be electrically connected to one second electrode channel 4, and then two electrical connection channels 5 are electrically connected to the second electrode lead terminal 2.

Such a setting manner further ensures an electrical connection effect, and also ensures that the three metal wiring layers are evenly arranged on the substrate 12, so that a problem of screen blanking is further avoided, and use efficiency of the touch screen is effectively improved.

An embodiment of the present disclosure further provides a display device, including a touch screen.

In the embodiment, the touch screen has the same beneficial effects as the above touch screen, which is not repeatedly described herein.

Obviously, those skilled in the art can make various modifications and variations to the present application without departing from the spirit and scope of the present application. In this way, if the modifications and variations of the present application fall within the scope of the claims of the present application and equivalent technologies thereof, the present application is also intended to include the modifications and variations.

What is claimed is:

1. A touch screen, comprising:
a substrate;
a first electrode lead terminal and a second electrode lead terminal, wherein the first electrode lead terminal and the second electrode lead terminal are arranged on one side of a peripheral region of the substrate;
a first metal wiring layer, a second metal wiring layer, and a third metal wiring layer, wherein the first metal wiring layer, the second metal wiring layer, and the third metal wiring layer are formed on the substrate;
a first insulation layer, wherein the first insulation layer is arranged between the first metal wiring layer and the second metal wiring layer; and
a second insulation layer, wherein the second insulation layer is arranged between the second metal wiring layer and the third metal wiring layer; wherein the first metal wiring layer comprises a plurality of first electrode channels extending along a first direction, and the plurality of first electrode channels are electrically connected to the first electrode lead terminal;
the second metal wiring layer comprises a plurality of second electrode channels extending along a second direction, and the second direction is perpendicular to the first direction;
a plurality of through holes are formed in the second insulation layer;
the third metal wiring layer comprises electrical connection channels, wherein the electrical connection channels are in one-to-one corresponding to the second electrode channels and extend along the first direction; and
in each pair of the electrical connection channel and the second electrode channel that are corresponding to each other, the electrical connection channel is electrically connected to the second electrode channel by using the through hole, to electrically connect the second electrode channel to the second electrode lead terminal;
wherein projections of the first metal wiring layer, the second metal wiring layer, and the third metal wiring layer on the substrate separate a portion of the substrate corresponding to an active area into a plurality of light transmission regions that are in a same shape and size and evenly distributed;
wherein the first metal wiring layer comprises first grid-like wirings, the first grid-like wirings comprise the plurality of first electrode channels and first redundancy wiring portions arranged between every two adjacent first electrode channels, and breaks are formed between portions of the first grid-like wirings arranged in the first redundancy wiring portions and portions of the first grid-like wirings arranged in the first electrode channels, to isolate the first electrode channels from the first redundancy wiring portions;
the second metal wiring layer comprises second grid-like wirings, and the second grid-like wirings comprise the plurality of second electrode channels and second redundancy wiring portions between every two adjacent second electrode channels, and breaks are formed between portions of the second grid-like wirings arranged in the second redundancy wiring portions and portions of the second grid-like wirings arranged in the second electrode channels, to isolate the second electrode channels from the second redundancy wiring portions; and
the third metal wiring layer comprises third grid-like wirings, and the third grid-like wirings comprise a plurality of electrical connection channels and third redundancy wiring portions between every two adjacent electrical connection channels, and breaks are formed between portions of the third grid-like wirings arranged in the third redundancy wiring portions and portions of the third grid-like wirings arranged in the electrode connection channels, to isolate the electrode connection channels from the third redundancy wiring portions.

2. The touch screen according to claim 1, wherein projections of the first grid-like wirings, the second grid-like wirings, and the third grid-like wirings on the substrate separate a portion of the substrate within the active area into a plurality of light transmission regions having regular triangular outlines.

3. The touch screen according to claim 2, wherein one side of each of the light transmission regions is parallel to the second direction.

4. The touch screen according to claim 2, wherein the projection of the first grid-like wirings on the substrate separates a portion of the substrate within the active area into a plurality of regions having regular hexagonal outlines;
the projection of the second grid-like wirings on the substrate separates a portion of the substrate within the active area into a plurality of regions having regular hexagonal outlines;
the projection of the third grid-like wirings on the substrate separates a portion of the substrate within the active area into a plurality of regions having regular hexagonal outlines; and
for three sides of each of the light transmission regions, a first side is formed by an orthographic projection of the first grid-like wiring on the substrate, a second side is formed by an orthographic projection of the second grid-like wiring on the substrate, and a third side is formed by an orthographic projection of the third grid-like wiring on the substrate.

5. The touch screen according to claim 1, wherein the first electrode channels are driving electrodes, and the second electrode channels are sensing electrodes.

6. The touch screen according to claim 1, wherein the first electrode channels are sensing electrodes, and the second electrode channels are driving electrodes.

7. The touch screen according to claim 1, wherein the first direction is a column direction, and the second direction is a row direction.

8. The touch screen according to claim 1, wherein at least a part of the second electrode channels are electrically connected to the second electrode lead terminal by using two electrical connection channels.

9. A display device, comprising the touch screen according to claim 1.

* * * * *